United States Patent [19]
Schreckenberg et al.

[11] 3,708,771
[45] Jan. 2, 1973

[54] OVERLOAD PROTECTION FOR ELECTRIC MOTORS

[75] Inventors: Karl Schreckenberg, Alberton; Louis Klein, Johannesburg; Lorenzo Antonio Read, Boksburg, all of Republic of South Africa

[73] Assignee: Fuchs Electrical Industries (Proprietary) Limited, Transvaal, Repbulic of South Africa

[22] Filed: Dec. 9, 1970

[21] Appl. No.: 96,304

[30] Foreign Application Priority Data

Dec. 12, 1969 South Africa..................69/8654

[52] U.S. Cl. ....................335/176, 335/45, 337/82
[51] Int. Cl. ..............................................H01h 71/74
[58] Field of Search ......335/45, 176, 43, 44; 337/38, 337/49, 50, 78, 83, 40, 82

[56] References Cited

UNITED STATES PATENTS

| | | | |
|---|---|---|---|
| 2,658,126 | 11/1953 | Filliette | 337/82 |
| 3,309,637 | 3/1967 | Jencks | 335/176 |
| 2,872,548 | 2/1969 | Christensen | 337/49 |
| 3,315,054 | 4/1967 | Langley | 337/82 |
| 2,674,672 | 4/1954 | Alter | 337/49 |

Primary Examiner—Harold Broome
Attorney—Dike, Thompson & Bronstein

[57] ABSTRACT

Electric overload protection apparatus comprising current sensitive means, connectable in an electric circuit and operative to perform an actuating function, such as to cause interruption of the electric circuit or to set off an alarm, when current flow through the current sensitive means exceeds a predetermined rated magnitude. The current sensitive means has a delayed response dependent on the magnitude of the excess current. Setting means is provided for changing the rating of the current sensitive means in a single step from a predetermined normal value to a predetermined higher value. The current sensitive means preferably includes at least one thermal sensitive bimetallic current conductor element which is arranged to flex and release a normally inoperative trigger when current flow through the bimetallic element exceeds the rated magnitude. The trigger is biased towards an operative position in which it can perform an actuating function.

2 Claims, 5 Drawing Figures

3,708,771

OVERLOAD PROTECTION FOR ELECTRIC MOTORS

This invention relates to overload protection, particularly for electric motors.

It is well known that the overload protection of electric motors presents a severe problem in view of certain contradictory requirements that have to be complied with. At starting, an electric motor draws a high current in excess of its normal rated value, the magnitude of the overcurrent and the time during which it is drawn being dependent on the type of motor involved and the load on the motor during starting. Where a motor is subjected to a variable load at starting, the starting current and the time during which it is drawn often varies over wide limits.

Once a motor is running, it normally draws less current than at starting, but the current drawn may still exceed the rated value due to changes in the load imposed on the motor. Here again the magnitude of the overcurrent and the time during which it is drawn can vary widely depending on the load conditions.

In providing protection for a motor, allowance must be made for the high overcurrent that is drawn during the starting period. However, if only the high starting current is considered, no protection would be provided for smaller overloads during running which, although it may safely be sustained for a short period, could be detrimental for the motor if allowed to continue for an extended period. On the other hand, if allowance is only made for lower overcurrent conditions during running, it may not be possible to start the motor since the protection system would trip out when the high starting current is drawn.

It is known to applicants that delayed response protection means having a high current rating capable of handling the high starting current, is often provided as sole protection for a motor. This is satisfactory for the starting period, but gives inadequate or no protection during running of the motor.

To complicate matters further, quick response protection should also be provided in the event of short circuit conditions being experienced.

Various suggestions for the overload protection of electric motors have been made and these suggestions have had varying degrees of success, but as far as applicants are aware, none of these suggestions have been able satisfactorily to cope with all the requirements either from the point of view of complete protection or cost.

It is accordingly an object of the present invention to provide improved overload protection for electric motors at a more economic level.

According to the invention electric overload protection apparatus includes current sensitive means connectable in an electric circuit and operative to perform an actuating function when current flow through the current sensitive means exceeds a predetermined rated magnitude, the current sensitive means having a delayed response dependent on the magnitude of the excess current; and setting means operative to change the rating of the current sensitive means in a single step from a predetermined normal value to a predetermined higher value.

The delayed response current sensitive means is preferably biased towards a condition of normal rating.

The apparatus may include adjustment means for varying the predetermined normal value of the current rating.

The predetermined higher value of the current rating may vary in sympathy with variation of the predetermined normal value.

The delayed response current sensitive means may include thermal sensitive, current conductor means displaceable in accordance with the magnitude of current flowing therethrough.

The apparatus may include trigger means biased towards an operative position in which it can perform an actuating function; and control means normally holding the trigger in inoperative position and arranged to be actuated by displacement of the thermal sensitive, current conductor means to release the trigger.

Further according to the invention the apparatus may include quick response current sensitive means adapted to perform an actuating function when the current flowing therethrough exceeds a predetermined value approaching short-circuit conditions.

The quick response current sensitive means may comprise an electro-magnetic device.

The actuating function may cause interruption of the electric circuit.

The quick response current sensitive means and the delayed response current sensitive means may be arranged to actuate common circuit interrupting means.

Alternatively or additionally, the actuating function may set off an alarm.

A preferred embodiment of the invention will now be described with reference to the accompanying drawings in which.

Figure 1:
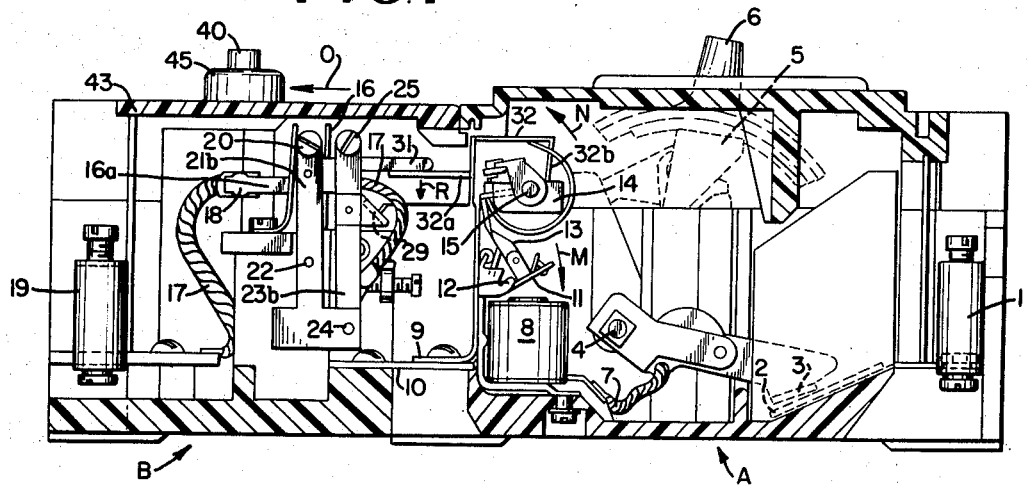
FIG. 1 is a longitudinal sectional view from one side, of the compartment of one of the phases of 3-phase overload protection apparatus according to the invention comprising quick response and delayed response current sensitive devices.

Referring first to FIG. 1, the apparatus comprises a quick response current sensitive device A connected in series with delayed response current sensitive device B.

Quick response device A may be of any suitable design and may comprise a conventional device. The device illustrated is a Westinghouse magnetic type FB 3270 ML circuit breaker comprising external terminals 1 electrically connected to stationary contact 2 which is associated with movable contact 3 which is pivotally mounted at 4 for movement between the closed position shown and a raised open position. Movable contact 3 is operatively connected mechanically to operating mechanism 5 which is provided with handle 6.

Movable contact 3 is electrically connected by lead 7 to electro-magnetic solenoid 8 which is electrically connected to terminal 9 of device A which, in turn, is electrically connected to terminal 10 of delay response device B.

Armature 11 is pivotally mounted at 12 and is connected to mechanism 13 associated at its upper end with tripping bar 14 extending transversely to the phase compartment.

Armature 11 is arranged to be displaced downwardly in the direction of arrow M when solenoid 8 is energized by current flow therethrough which exceeds a predetermined value approaching short circuit conditions.

When armature 11 is attracted towards solenoid 8 in the direction of arrow M, mechanism 13 is operated to tilt tripping bar 14 about its axis 15 in the direction of arrow N to trip the circuit breaker and open movable contacts 3. The operation of the tripping mechanism is well known in the art and does not form part of the present invention.

The operation of armature 11 and the tripping mechanism has a quick response once solenoid 8 is energized sufficiently to attract armature 11.

Referring now to FIGS. 1, 2, 3 and 5, delayed response device B comprises three thermal sensitive, current carrying bimetallic elements 16, one bimetallic element for each phase of the apparatus.

Figure 3:
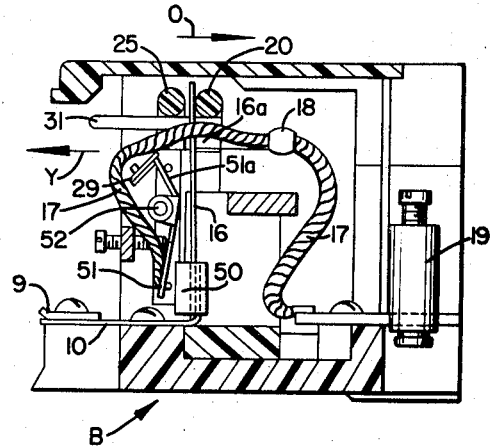
FIG. 3 is another longitudinal sectional view from the same side as FIG. 2, of the delayed response current sensitive device, showing overload protection means for the thermal sensitive means of the device.

As can best be seen from FIG. 3, the bimetallic element 16 of each phase is connected at its lower end to a terminal 10 of device B, which, in turn, is connected to a corresponding terminal 9 of quick response device A. Towards its upper end, each bimetallic element 16 is connected by means of a rigid connector 16a to a flexible lead 17 at 18. (See FIGS. 1 and 3). Flexible lead 17 is connected to external terminal 19 of delayed response device B.

When current flows through device B, bimetallic elements 16 heat up and flex transversely in the direction of arrow O to an extent depending on the magnitude of the current. Upon flexing, bimetallic elements 16 push against main trip bar 20.

Main trip bar 20 is connected at opposite ends to main support members 21a, 21b which are pivotally mounted intermediate their ends at 22. An additional pair of support members 23a, 23b are pivotally mounted at their lower ends on main support members 21a, 21b at 24 and carry between them at their upper ends an additional trip bar 25.

Figure 5:
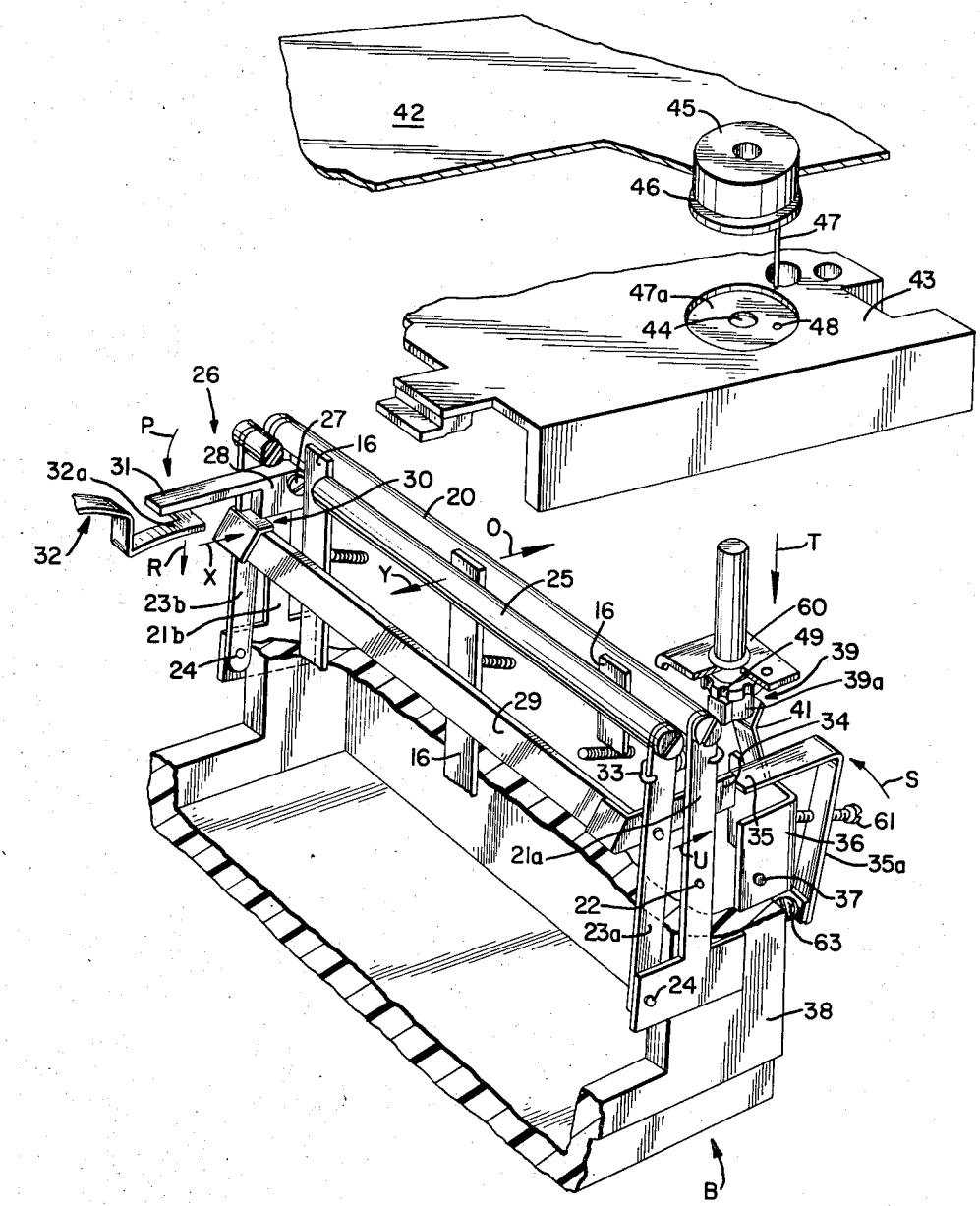
FIG. 5 is an exploded, fragmentary perspective view from the same side as FIGS. 2 and 3, of the tripping arrangement of the delayed response device of FIGS. 1 and 2 and of an arrangement for locking the rating setting means against displacement.

Trigger 26 is pivotally mounted on main support member 21b at 27 and is resiliently biased by means of a spring (not shown) for rotation in the direction of arrow P in FIG. 5, towards an operative position in which it can perform an actuating function.

Abutment 28 on trigger 26 is adapted normally to seat on stop bar 29 extending between additional support members 23a, 23b. As can be seen in FIG. 5, trigger 26 is held in an inoperative position when abutment 28 is seated on stop bar 29. However, when main trip bar 20 is moved a sufficient distance in the direction of arrow O by any one or more of bimetallic elements 16, abutment 28 moves beyond the latch 30 of stop bar 29 and is released so that the bias can exert itself and rotate trail 31 on trigger 26 downwardly towards its operative position in the direction of arrow P.

Movement of trigger 26 towards its operative position may be utilized to perform any required actuating function.

In the embodiment illustrated, downward movement of tail 31 on trigger 26 in the direction of arrow P, causes tail 31 to depress the end 32a of trip lever 32 downwardly in the direction of arrow R (FIGS. 1 and 5).

As can best be seen in FIG. 1, trip lever 32 extends from delayed response device B to quick response device A and is secured at its end 32b to trip bar 14 in such a way that trip bar 14 is pivoted in the direction of arrow N to trip the circuit breaker of device A and open movable contacts 3, when end 32a is depressed in the direction of arrow R.

It will be seen that common circuit breaking means is provided for the two devices A and B and that these two devices are adapted to actuate a common tripping device. Delayed response device B causes tripping to be effected mechanically without an electro-magnetic shunt trip being required.

It will be appreciated that the response of bimetallic elements 16 is not instantaneous once current flow therethrough exceeds a predetermined magnitude. The bimetallic elements 16 have a delayed response in well known manner as they heat up and flex with increased current flow therethrough. The response is dependent on the magnitude of the excess current and becomes more rapid as the magnitude of the excess current increases.

The amount of flexing of bimetallic elements 16 and thus the magnitude of current flowing through elements 16, which is required before the common tripping device is actuated, depends on the relative positioning of abutment 28 of trigger 26 and the latch 30 of stop bar 29. The current rating at which delayed response device B will actuate the tripping device can thus be set by adjusting the position of stop bar 29 relative to abutment 28 so as to adjust the extent to which they overlap in the inoperative position of trigger 26 shown in FIG. 5.

As shown in FIG. 5, additional trip bar 25, additional support members 23a, 23b and stop bar 29 are biased towards main trip bar 20 by means of spring 33 between main and additional support members 21a, 23a.

Control arm 34 is fast with stop bar 29 and with additional support member 23a and is adapted to bear with its free end against stop member 35. The position of stop member 35 is adjustable so that the position of stop bar 29 relative to abutment 28 is adjustable, thereby to permit adjustment of the current rating at which the delayed response device will trip the circuit breaker.

Stop member 35 is secured to adjustment lever 36 which is pivotally mounted at 37 on base 38 and is biased by spring 63 in the direction of arrow S about 37 towards control arm 34. The movement of adjustment lever 36 in the direction of arrow S is limited by base 38 on which adjustment lever 36 is mounted. The normal position of stop member 35 when support 36 abuts base 38, can be adjusted by means of calibration screw 61 which permits the spacing between adjustment lever 36 and the tail 35a of stop member 35 to be adjusted. Tail 35a of stop member 35 is in the nature of a leaf spring which biases itself towards adjustment lever 36.

By adjustment of calibration screw 61, the normal value of the current rating of delay response device B is obtained. Calibration screw 61 may then be locked in position such as by detachably securing it to tail 35a of stop member 35 by means of solder.

Figure 2:
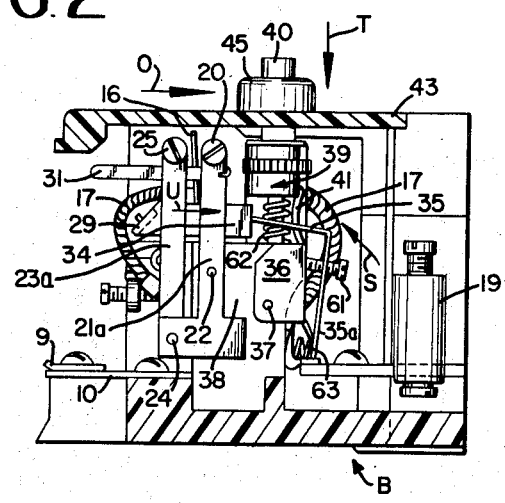
FIG. 2 is a longitudinal sectional view from the opposite side, of the delayed response current sensitive device of FIG. 1, showing the rating setting means of the device.

As can best be seen from FIGS. 2 and 5, the rating of the delayed response device B can be changed in a single step from its normal value to a predetermined higher value, by means of displacement member 39 which can be moved downwardly in the direction of arrow T by means of push button 40.

Normally, displacement member 39 is biased upwardly by means of spring 62 (FIG. 2) towards the inoperative position shown in which tail 41 on adjustment lever 36 bears against cam profile 39a of displacement member 39. In this position, the rating of delayed response device B is at its normal value.

When a higher current rating is required from delay response device B, push button 40 is depressed to move displacement member 39 downwardly in the direction of arrow T so that it presses against the inclined end of tail 41 on adjustment lever 36 and pivots adjustment lever 36 and stop member 35 about 37 in a direction opposite to that shown by arrow S. This causes control arm 34 to move in the direction of arrow U, thereby to cause latch 30 of stop bar 29 to move further underneath abutment 28 of trigger 26 in the direction of arrow X. It will be appreciated that increased flexing of bimetallic elements 16 is required to move abutment 28 off stop bar 29 and cause tripping of the circuit breaker. The apparatus can therefore carry an increased current without tripping of the circuit breaker.

In order to permit adjustment of the normal current rating of delay response device B as obtained by the setting of calibration screw 61, displacement member 39 is provided with curved cam profile 39a (FIG. 5) and is rotatably mounted with push button 40 in mounting bracket 60. By simply rotating push button 40, different zones of cam profile 39a lying at different distances from the axis of rotation can be located opposite adjustment lever tail 41. The normal positions which displacement lever 36 and stop member 35 assume under the biasing influence of spring 63 when displacement member 39 is in its inoperative position, will depend on the particular zone of cam profile 39a engaging adjustment lever tail 41. By varying the circumferential position of displacement member 39, the normal position of displacement lever tail 41 can be varied. The position which stop bar 29 assumes relative to abutment 28 of trigger 26 can thus be adjusted to vary the current rating setting of delay response device B under normal conditions.

The circumferential position of displacement member 39 influences not only the normal position of adjustment lever tail 41, but also the position to which adjustment lever tail 41 is displaced by displacement member 39, when push button 40 is depressed to change the rating in a single step from a predetermined normal to a predetermined higher value. Rotation of push button 40 therefore varies the higher value of current rating in sympathy with variation of the normal value.

As can be seen from FIG. 2, calibration screw 61 for setting the normal running current rating of device B, is located within the casing 43 of the device and cannot be tampered with to alter the setting, without opening the casing. Push button 40 is, however, easily accessible from the outside of the casing.

In order to avoid accidental or mischievous alteration of the normal current rating, the device B may be located behind a panel door 42 as shown in FIG. 5. Push button 40 is adapted to extend through aperture 44 in casing 43 and through a locking member 45 presenting a flange 46 adapted to seat in external recess 47a in casing 43 and to abut against the inside of panel door 42 when the panel door is in position against casing 43 with locking member 45 passing through an aperture in panel door 42. Engagement of flange 46 with the surrounds of the aperture in panel door 42, prevents withdrawal of locking member 45 through the panel door 42.

A locking pin 47 extends from locking member 45 through aperture 48 in casing 43 into the interior of device B and is adapted to engage in one or other of the notches 49 in the upper part of displacement member 39, depending on the circumferential setting of displacement member 39. This prevents rotation of displacement member 39. If the normal current rating is to be altered, the panel door 42 and locking member 45 have first to be removed to permit rotation of displacement member 39.

As stated above, quick response device A is arranged to operate only when the current flow through the apparatus exceeds a predetermined value approaching short circuit conditions. In order to avoid damage to the bimetallic elements 16 by high currents below the predetermined short-circuit value, a single turn type of solenoid 50 is connected in series with each of the bimetallic elements 16 as shown in FIG. 3. An armature comprising a movable contact 51 is pivotally mounted at 52 and is connected to flexible lead 17. When the current through a bimetallic element 16 exceeds a predetermined value, solenoid 50 attracts movable contact 51 to engage a contact (not shown) at the lower end of the bimetallic element 16. It will be appreciated that a shunt path is completed through flexible lead 17 from point 18, through movable contact 51 to the bottom of bimetallic element 16, thereby to divert current flow from the bimetallic element 16.

The apparatus described above may be used for any suitable overload protection. It may, for example, be connected in series with a three-phase electric motor. The rating of delayed response device B may be adjusted by rotation of displacement member 39, to a required normal running value equivalent to motor full load current, say 50 amps, which would provide adequate protection while the motor is running. By depressing push button 40, a higher starting rating is obtained which would allow sufficient current to be drawn to permit starting of the motor under normal conditions and which would not cause tripping of the circuit breaker during the normal starting period and under normal starting conditions. However, delayed overload protection is still obtained if too high a current is drawn for too long a period of time as well as quick response protection if the current exceeds locked rotor current values.

When the motor is to be started, push button 40 is depressed to increase the rating of delayed response device B in a single step from the normal running value to the starting value. The rating is held at the starting value by holding button 40 depressed, until the motor is running normally, whereafter button 40 is released to permit device B to return to a condition of normal rating under the influence of biasing springs 62 and 63. In this manner, the motor is allowed to start and adequate protection is provided both during starting and during running of the motor.

It will be appreciated that many variations in detail are possible without departing from the scope of the appended claims.

Figure 4:
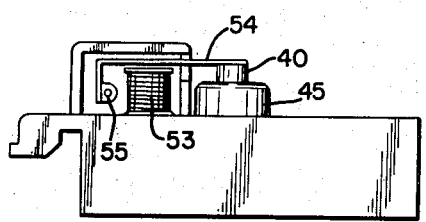
FIG. 4 is a side view of automatic actuating means for the rating setting means of FIG. 2.

For example, push button 40 for changing the current rating from the normal value to the higher value may be actuated manually or automatically. An automatic arrangement is illustrated in FIG. 4 where a remotely energizable solenoid 53 is provided with an armature 54 pivoted at 55 and extending over push button 40. When solenoid 53 is energized, armature 54 is attracted downwardly towards solenoid 53 to depress push button 40. When solenoid 53 is de-energized push button 40 is released. The operation of solenoid 53 may be with or without a time delay.

The tripping arrangement of FIG. 5 includes the facility that the circuit breaker of quick response device A is tripped when an open circuit occurs in any of the phases. When such an open circuit occurs, current flow through the relevant bimetallic element 16 is interrupted so that it straightens out and moves in the direction of arrow Y in FIG. 5, thereby to displace additional trip bar 25 in the same direction. Such displacement pushes stop bar 29 which is fast with additional trip bar 25, from underneath abutment 28 of trigger 26, thereby allowing the trigger to actuate the tripping mechanism.

Delayed response device B may be used in conjunction with any suitable circuit breaking device other than quick response device A. Where device B is used with a manually operated circuit breaker without an automatic tripping device such as solenoid 8, the arrangement of FIG. 3 may be adapted to provide automatic tripping on excessive overload. Thus tail 51a on movable contact 51 may be adapted to engage stop bar 29 and displace it in the direction of arrow Y when movable contact 51 is attracted by solenoid 50 as described above. Displacement of stop bar 29 causes operation of trigger 26 which can be utilized in any suitable manner to open the circuit interrupting device.

Trigger 26 may be arranged to cause interruption of the electrical circuit in which it is connected, to be effected mechanically without any additional electrically operated shunt or under voltage release device in the circuit interrupting device being required.

In an alternative arrangement, movement of tail 31 of trigger 26 towards its operative position in the direction of arrow P, may be utilized to operate a micro-switch or any other suitable control or actuating switch. Operation of the control or actuating switch may be utilized to cause a circuit interrupting device to be opened electro-magnetically, such as by means of a shunt or under voltage tripping device. This arrangement permits delayed response device B to be located remotely from the circuit interrupting device.

Additionally or alternatively, the operation of the control or actuating switch may be utilized to set off an alarm which may be visual or audible. It will be appreciated that movement of trigger 26 towards its operative position may be utilized to perform any suitable actuating function, such as to cause interruption of the electric circuit and/or to set off an alarm.

We claim:

1. Electric overload protection apparatus comprising delayed response thermal sensitive; current conductor means connectable in an electric circuit and displaceable in accordance with the magnitude of current flowing therethrough; trigger means biased towards an operative position in which it can perform an actuating function; control means normally holding the trigger in inoperative position and arranged to be actuated by displacement of the thermal sensitive current conductor means to release the trigger; and sensitivity setting means operable upon the control means and resiliently biased towards a normal position at which the sensitivity of operation of the control means is maintained at a normal operating value so that the trigger is released when current flow through the thermal sensitive current conductor exceeds a predetermined normal magnitude, the sensitivity setting means being displaceable against the action of the bias to an overcurrent position at which the sensitivity of operation of the control means is decreased temporarily to a value such that the trigger is released only when an overcurrent of predetermined magnitude in excess of the normal magnitude flows through the thermal sensitive conductor means, the sensitivity setting means being automatically returnable to its normal position by the bias when not being displaced.

2. Electric overload protection apparatus including trigger means biased towards an operative position in which it can perform an actuating function; stop means normally holding the trigger in inoperative position, the trigger and stop means being relatively displaceable to release the trigger, the relative positioning of the stop means and the trigger when the latter is held inoperative being variable to vary the relative displacement required to release the trigger; at least one thermal sensitive, bimetallic current conductor element connectable in an electric circuit and arranged to flex to an extent dependent on the magnitude of current flowing therethrough, flexure of the bimetallic element acting to relatively displace the stop means and the trigger; and sensitivity setting means operative to change the relative displacement between the trigger and the stop means required to release the trigger, the sensitivity setting means being resiliently biased towards a normal position at which the relative positioning of the trigger and the stop means is held in a normal condition so that the trigger is released after a predetermined normal relative displacement caused by current flow through the bimetallic element in excess of a predetermined normal magnitude, the sensitivity setting means being displaceable against the action of its bias to an overcurrent position at which the relative positioning of the trigger and the stop means is temporarily changed to a condition such that the trigger is only released after an increased relative displacement caused by an overcurrent of predetermined magnitude in excess of the normal magnitude.

* * * * *